United States Patent
Mukerjee et al.

(10) Patent No.: US 10,784,518 B2
(45) Date of Patent: Sep. 22, 2020

(54) NITROGEN-FUNCTIONALIZED PLATINUM-IRIDIUM ELECTROCATALYST

(71) Applicant: Northeastern University, Boston, MA (US)

(72) Inventors: Sanjeev Mukerjee, Mansfield, MA (US); Michael Bates, Lynn, MA (US); Shraboni Ghoshal, Malden, MA (US); Huong Thi Thanh Doan, West Roxbury, MA (US)

(73) Assignee: Northeastern University, Boston, MA (US)

( * ) Notice: Subject to any disclaimer, the term of this patent is extended or adjusted under 35 U.S.C. 154(b) by 116 days.

(21) Appl. No.: 15/572,563

(22) PCT Filed: May 12, 2016

(86) PCT No.: PCT/US2016/032173
§ 371 (c)(1),
(2) Date: Nov. 8, 2017

(87) PCT Pub. No.: WO2016/183356
PCT Pub. Date: Nov. 17, 2016

(65) Prior Publication Data
US 2018/0131008 A1     May 10, 2018

Related U.S. Application Data

(60) Provisional application No. 62/160,241, filed on May 12, 2015.

(51) Int. Cl.
*H01M 4/92* (2006.01)
*H01M 8/18* (2006.01)
(Continued)

(52) U.S. Cl.
CPC ............. *H01M 4/926* (2013.01); *C25B 1/02* (2013.01); *C25B 11/04* (2013.01); *H01M 4/88* (2013.01);
(Continued)

(58) Field of Classification Search
CPC ........ H01M 4/926; H01M 4/88; H01M 4/921; H01M 4/923; H01M 8/188; C25B 1/02; C25B 11/04
(Continued)

(56) References Cited

U.S. PATENT DOCUMENTS

| | | | |
|---|---|---|---|
| 2004/0121219 A1* | 6/2004 | Mei | B82Y 30/00 429/483 |
| 2008/0157228 A1* | 7/2008 | Chambers | H01L 21/28079 257/407 |

(Continued)

FOREIGN PATENT DOCUMENTS

| | | | |
|---|---|---|---|
| JP | 2006278194 A | * | 10/2006 |
| WO | 2013/090267 A1 | | 6/2013 |
| WO | 2014/014503 A1 | | 1/2014 |

OTHER PUBLICATIONS

M. Bates, "Investigation of the Alkaline Electrochemical Interface and Development of Composite Metal/Metal-Oxides for Hydrogen and Oxygen Electrodes", Dissertation, Northeastern University, Apr. 6, 2015.
(Continued)

*Primary Examiner* — Sean P Cullen
(74) *Attorney, Agent, or Firm* — Verrill Dana, LLP

(57) ABSTRACT

The invention provides a nitrogen-functionalized platinum-transition metal catalyst having the formula Pt-M-$N_x$/C (where M is a transition element such as Fe, Co, Ni, Nb, Ta, Ir, Rh, or Ru) for use at the hydrogen electrode of a hydrogen/bromine redox flow battery. The new catalyst
(Continued)

possesses excellent activity and durability in the $HBr/Br_2$ environment, showing superior resistance to halide poisoning than conventional Pt/C or Pt-M/C catalysts.

9 Claims, 10 Drawing Sheets

(51) Int. Cl.
  *C25B 1/02* (2006.01)
  *H01M 4/88* (2006.01)
  *C25B 11/04* (2006.01)
  *H01M 8/1018* (2016.01)

(52) U.S. Cl.
  CPC ............ *H01M 4/921* (2013.01); *H01M 4/923* (2013.01); *H01M 8/188* (2013.01); *C25B 11/0473* (2013.01); *H01M 2008/1095* (2013.01); *Y02E 60/528* (2013.01)

(58) Field of Classification Search
  USPC .................................... 429/524, 526, 527
  See application file for complete search history.

(56) References Cited

U.S. PATENT DOCUMENTS

| | | | |
|---|---|---|---|
| 2010/0234210 A1* | 9/2010 | Kawamura | H01M 4/9041 |
| | | | 502/101 |
| 2012/0299384 A1 | 11/2012 | Peled et al. | |
| 2012/0308907 A1 | 12/2012 | Peled et al. | |
| 2014/0234684 A1* | 8/2014 | Sanchez-Carrera | H01M 8/20 |
| | | | 429/106 |

OTHER PUBLICATIONS

G. Lin, et al., "Advanced Hydrogen-Bromine Flow Batteries with Improved Efficiency, Durability and Cost", Journal of the Electrochemical Society, Sep. 1, 2015, vol. 163, No. 1, pp. A5049-A5056.

K.T. Cho, et al., "High Performance Hydrogen/Bromine Redox Flow Battery for Grid-Scale Energy Storage", Journal of the Electrochemical Society, Sep. 5, 2012, vol. 159, No. 11, pp. A1806-A1815.

T. Nguyen, et al., "Flow Batteries", The Electrochemical Society, Interface, Fall 2010, pp. 54-56.

* cited by examiner

NITROGEN-FUNCTIONALIZED PLATINUM-IRIDIUM ELECTROCATALYST

STATEMENT REGARDING FEDERALLY SPONSORED RESEARCH OR DEVELOPMENT

The invention was developed with financial support from Grant No. DE-AR0000262 from the Department of Energy. The U.S. Government has certain rights in the invention.

BACKGROUND

The hydrogen/bromine redox flow battery (HB-RFB) is a promising candidate for large-scale energy storage due to its fast kinetics, highly reversible reactions, and low chemical costs. The primary advantage of the HB-RFB system over the current state-of-the-art vanadium redox flow battery (V-RFB) system is the orders-of-magnitude higher power density achievable by the HB-RFB system. In particular, V-RFB systems can only achieve 0.5-2 $kW/m^2$, whereas HB-RFB systems can easily achieve 5-20 $kW/m^2$ power density. This significant increase in power density places the HB-RFB system in the forefront of energy storage technologies for rapid grid buffering. In addition to the high power density of HB-RFBs, the modular and highly scalable nature of RFBs in general makes them ideal candidates to overcome the intermittency issues related to wind and solar renewable energy production. However, none of the advantages of HB-RFBs would be achievable without a high-stability reversible hydrogen electrode and other materials.

Present HB-RFBs use membrane materials (such as NAFION), catalysts (platinum), and electrode materials (carbon paper) that are expensive. In addition, platinum catalysts can be poisoned and corroded when exposed to HBr and $Br_2$, compromising system lifetime. To reduce the cost and increase the durability of $H_2/Br_2$ flow batteries, new materials have recently been developed. Recently developed NAFION/polyvinylidene fluoride electrospun composite membranes have high perm-selectivity at a fraction of the cost of NAFION membranes, and the recently developed carbon nanotube-based $Br_2$ electrodes can achieve equal or better performance with less materials when compared to previous electrode materials. However, there remains a need to develop improved catalysts for use at the $H_2$ electrode to replace platinum catalysts.

SUMMARY OF THE INVENTION

The invention provides a nitrogen-functionalized platinum-iridium catalyst for use at the hydrogen electrode of a hydrogen/bromine redox flow battery. The new catalyst possesses excellent activity and durability in the $HBr/Br_2$ environment.

One aspect of the invention is a catalyst having a formula of $Pt_y$-$M_z$-$N_x$. Where M is a transition element high co-solubility with Pt including, for example, Fe, Co, Ni, Nb, Ta, Ir, Rh, and Ru. In certain embodiments, $0.1 \leq x \leq 10$ (assuming that $y=z=1$), and in other embodiments, $2 \leq x \leq 6$, or $3 \leq x \leq 5$. The Pt:M ratio can range from 1:9 to 9:1 (i.e., $1 \leq y \leq 9$ and $1 \leq z \leq 9$); in a preferred embodiment, $y=z=1$. In a preferred embodiment, M=Ir, and the ratio of Pt:Ir ranges from 0.1 to 4. The ratio of N to metal (i.e., N:(Pt+M)) can vary from 0.1 to 10. In certain embodiments, the catalyst is in the form of Pt-M-$N_x$ nanoparticles bound to a solid support, such as carbon black nanoparticles or microparticles, or another form of solid support. In embodiments where the metallic nanoparticles are bound to carbon particles or another solid support (e.g., Pt-M-$N_x$/C particles), the metallic portion (i.e., the Pt-M-$N_x$ portion) constitutes about 10-70% by weight of the total particles. In addition, the synthesis method described herein likely produces some amount of nitrogen-doped carbon support such that the catalyst composition is, for example, Pt—Ir—$N_x$/N-doped C.

Another aspect of the invention is an electrode coated with the catalyst described above. The electrode can be, for example, the hydrogen electrode of a hydrogen-bromine redox flow battery.

Yet another aspect of the invention is a hydrogen-bromine redox flow battery containing the catalyst described above, or the electrode described above.

A further aspect of the invention is a proton exchange membrane electrolyzer containing the catalyst described above.

Still another aspect of the invention is a method of making a Pt-M-$N_x$/C catalyst. The method includes the steps of: (a) providing an aqueous solution containing a platinum salt and an iridium salt; (b) adding a nitrogen complexing agent to the solution provided in step (a); (c) adding carbon black particles to the solution obtained from step (b) to form a suspension; (d) mixing the suspension and allowing the nitrogen-containing complexing agent to react with the platinum and iridium, whereby Pt-M-$N_x$/C (such as Pt—Ir—$N_x$/C) particles are formed, the particles comprising Pt-M-$N_x$ nanoparticles adsorbed to the carbon black particles; (e) separating the Pt-M-$N_x$/C particles from the suspension; and (f) annealing the Pt-M-$N_x$/C particles.

Another aspect of the invention is a method of making a hydrogen-bromine redox flow battery. The method includes adding the catalyst described above to a precursor structure as part of a process of producing a hydrogen-bromine redox flow battery.

The invention can be further summarized by the following listing of embodiments.

1. A catalyst having a formula of Pt-M-$N_x$.
2. The catalyst of embodiment 1, wherein $0.1 < x < 10$.
3. The catalyst of embodiment 1 or embodiment 2 in the form of Pt-M-$N_x$ nanoparticles bound to a solid support.
4. The catalyst of embodiment 3, wherein the solid support is carbon black nanoparticles or microparticles.
5. The catalyst of any of the previous embodiments that is suitable for use as an electrocatalyst in a reversible hydrogen electrode of a hydrogen-bromine redox flow battery.
6. The catalyst of any of the previous embodiments that is more stable in a hydrogen-bromine redox flow battery than a Pt/C or Pt-M/C catalyst.
7. The catalyst of any of the previous embodiments that is more resistant to halide poisoning hydrogen-bromine redox flow battery than a Pt/C or Pt-M/C catalyst.
8. An electrode comprising the catalyst of any of the previous embodiments.
9. A hydrogen-bromine redox flow battery comprising the catalyst of any of embodiments 1-7 or the electrode of embodiment 8.
10. A proton exchange membrane electrolyzer comprising the catalyst of any of embodiments 1-7.
11. A method of making a Pt-M-$N_x$/C catalyst, the method comprising the steps of:
    (a) providing an aqueous solution comprising a platinum salt and an iridium salt;
    (b) adding a nitrogen complexing agent to the solution provided in step (a);
    (c) adding carbon black particles to the solution obtained from step (b) to form a suspension;

(d) mixing the suspension and allowing the nitrogen-containing complexing agent to react with the platinum and iridium, whereby Pt-M-$N_X$/C particles are formed, the particles comprising Pt—Ir—$N_X$ nanoparticles adsorbed to the carbon black particles;

(e) separating the Pt-M-$N_X$/C particles from the suspension; and (f) annealing the Pt-M-$N_X$/C particles.

12. The method of embodiment 11, wherein the nitrogen-containing complexing agent is 1,3-propylenediamine.

13. The method of embodiment 11 or embodiment 12, wherein the platinum and iridium salts are chloride salts.

14. The method of any of embodiments 11-13, wherein the carbon black particles are nanoparticles.

15. The method of any of embodiments 11-14, wherein step (d) is carried out at ambient temperature for about 8 to about 20 hours.

16. The method of any of embodiments 11-15, wherein step (e) comprises collecting the particles by filtering the suspension, and washing and drying the particles.

17. The method of any of embodiments 11-16, wherein step (f) is performed in an argon atmosphere.

18. The method of any of embodiments 11-17, wherein step (f) is performed at about 700° C.

19. A Pt-M-$N_X$/C catalyst made by the method of any of embodiments 11-18.

20. A method of making a hydrogen-bromine redox flow battery, the method comprising adding the catalyst of any of embodiments 1-7 to a structure as part of a process to produce a hydrogen-bromine redox flow battery.

BRIEF DESCRIPTION OF THE DRAWINGS

FIG. 2A shows results from testing in a $H_2$ pump cell. FIG. 2B shows results from testing in a flow cell. The membrane was boiled NR212, not hot-pressed; the $Br_2$ electrode was 3pc SGL-10AA; and the solution was 1 M HBr/0.9 M $Br_2$, at a flow rate of 20 mL/min. The Pt catalyst was loaded at 0.48 mg Pt/$cm^2$, and the Pt—Ir—$N_X$ catalyst was loaded at 0.28 mg Pt—Ir/$cm^2$.

FIG. 3A shows the setup for normal operation, and FIG. 3B shows the setup for the soaking test.

FIG. 4A shows polarization as a function of soak time. The numbers in parentheses indicate the duration of each soak (first number) and the cumulative duration of soak (second number). FIG. 4B shows maximum power normalized to initial catalyst loading.

FIG. 6A shows capacity and efficiency, and FIG. 6B shows cell polarization performance.

DETAILED DESCRIPTION OF THE INVENTION

The invention provides a Pt-M-$N_X$/C electrocatalyst that exhibits significantly increased stability in the highly corrosive HBr/$Br_2$ electrolyte of the $H_2$—$Br_2$ redox flow battery (HB-RFB) system compared to standard commercial catalysts. The stability is related to the fact that the novel catalyst material exhibits an increased tolerance to halide adsorption ("poisoning") and corrosion compared to state-of-the-art commercial Pt/C and Pt—Ir/C catalysts. This is exemplified by the new Pt—Ir—$N_X$/C catalyst material, which exhibits improved performance and reduces costs for use of the HB-RFB system for grid-scale energy storage.

Advantages of the Pt-M-$N_X$/C catalyst, as exemplified by Pt—Ir—$N_X$/C, include: (i) extremely fast hydrogen oxidation and hydrogen evolution reaction kinetics ($i_0$=1.6 A/mg based on hydrogen-pump testing) than a standard Pt/C catalyst ($i_0$=1.2 A/mg) or a halide-tolerant RhS/C catalyst ($i_0$=0.3 A/mg); (ii) resistance to halide adsorption ("poisoning"); and (iii) resistance to corrosion (caused by exposure to $Br_2$) under high-voltage cycling.

Figure 1:
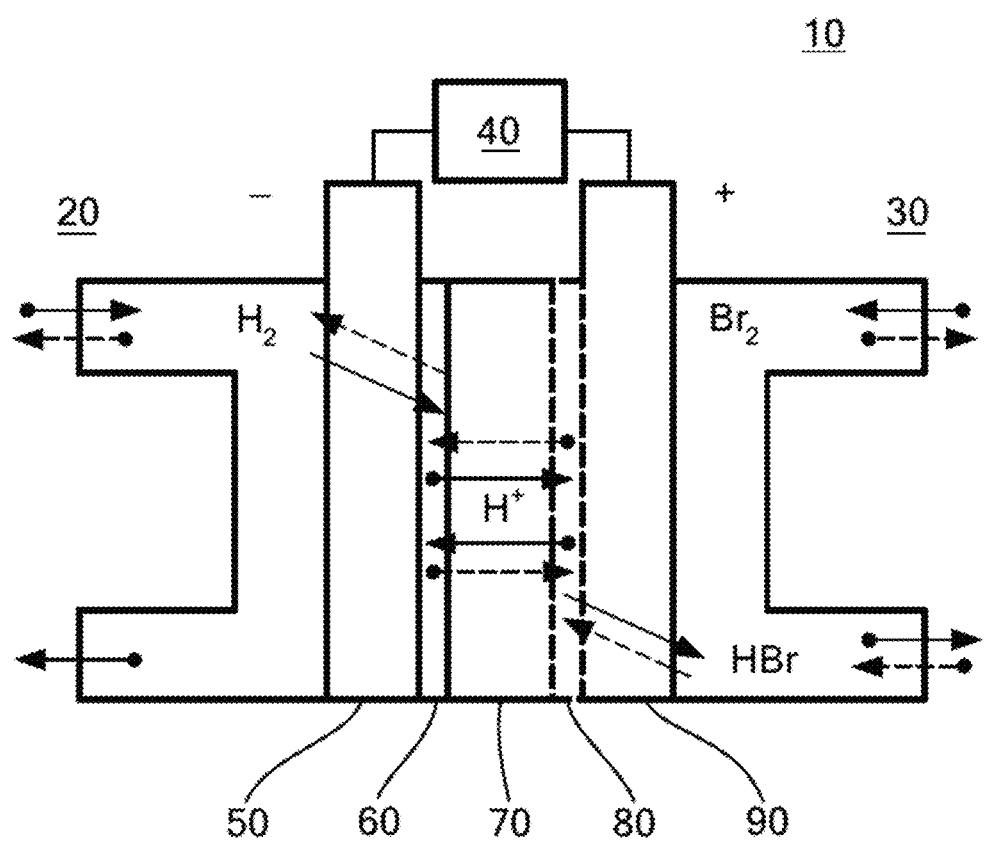
FIG. 1 shows a schematic illustration of a hydrogen-bromine redox flow battery.

The Pt-M-$N_X$/C catalyst material, as exemplified by Pt-Ir-$N_X$/C, is ideally suited for use on the reversible hydrogen electrode of a HB-RFB system. FIG. 1 shows a schematic illustration of a HB-RFB system. System 10 includes reversible flow subsystems for $H_2$/$H_2O$ (20) and $Br_2$/HBr (30). The reactants provided by the flow subsystems enter through porous electrodes 50 and 90, which are attached to load 40. Catalysts for $H_z$ (60) and $Br_2$ (80) are attached to the electrodes where at their interfaces with H+-permeable membrane 70. The dotted lines indicate direction of flow during charging, and solid lines during discharging. Serving as the Hz electrode for the HB-RFB system, the Pt-Ir-$N_X$/C catalyst can improve the performance and reduce the cost of the promising HB-RFB energy storage technology for grid-scale and smaller scale energy storage and power buffering for use with renewable energy systems. However, the Pt-Ir-$N_X$/C catalyst material has other uses as well, such as the catalyst at the cathode of a proton exchange membrane (PEM) electrolyzer, where it performs the same reaction as the HB-RFB system during discharging.

The Pt-M-$N_X$/C catalyst differs from earlier Pt/C and Pt-M/C catalysts in that it is nitrogen functionalized. The method of synthesis utilizes a nitrogen-containing metal chelator, which complexes with Pt and M salts in aqueous solution, and then becomes bound together with the Pt and M metals in the pores of high surface-area carbon black. The catalyst is synthesized using a solvo-chemical method. Platinum and M salts, such as chlorides or other water-soluble salts, are dispersed in water followed by the addition of a nitrogen complexing agent, such as 1,3-propylenediamine, although any nitrogen containing organic chelator having a high affinity for Pt and Ir ions could be used. Finally, the carbon black support particles are added, and the reactants are stirred at room temperature overnight, during which time the nitrogen-complexed metals absorb into the pores of the high surface-area carbon support. The resulting solid product can be separated, for example, by filtration, washing, and drying in a vacuum-oven, and then annealed at high heat under an inert atmosphere, such as at 700° C. under argon.

The resulting electrocatalyst displays dramatically enhanced stability in the highly-corrosive HBr/$Br_2$ electrolyte. The enhanced stability to high-voltage cycling and bromine-soaking conditions are demonstrated in the examples which follow.

The cost of a Pt-M-$N_X$/C catalyst, such as Pt—Ir—$N_X$/C, was assessed and compared to that of Pt/C catalyst. The atomic ratio of Pt:Ir in the Pt—Ir—$N_X$/C catalyst is 1:1, and it can be reasonably assumed that the cost of noble metals dominates the final catalyst cost. The monthly highest prices in the last five years, $1800/oz for Pt and $1085/oz for Ir, were used to estimate the cost of Pt—Ir—$N_X$/C. The resulting cost of new catalyst is about $1442.5/oz which is less expensive than Pt. The activity is similar to Pt catalyst in $H_2$/$Br_2$ flow cells, so a loading of 0.05 mg-metal/$cm^2$ is assumed to be consistent with the Pt loading used in the system model, resulting in a catalyst cost of $23/m$^2$ (active electrode area). Given the enhanced stability of the Pt—Ir—$N_X$/C catalyst expected under operating conditions, the new catalyst is expected to offer substantial cost savings over time when operating a HB-RFB system.

EXAMPLES

Example 1. Synthesis of Nitrogen-Functionalized Platinum-Iridium Catalyst

A nitrogen-functionalized platinum-iridium catalyst (Pt—Ir—$N_X$) supported on high surface-area carbon black (Pt—Ir—$N_X$/C) was synthesized via a solvo-chemical method, modified from the development of Pt—$N_X$/C described by Oh and Kim (J.-G. Oh and H. Kim, Journal of Power Sources, 181(1), 74 (2008)). Platinum and iridium chloride salts were dispersed in water followed by the addition of a nitrogen complexing agent (1,3-propylenediamine) and finally the addition of the carbon black support particles. The reactants were stirred at room temperature overnight, during which time the nitrogen-complexed metals absorbed into the pores of the high surface-area carbon support. The resulting solid product was filtered, washed, dried in a vacuum-oven and then annealed in a tube furnace at 700° C. under an inert argon atmosphere. The resulting Pt—Ir—$N_X$/C catalyst had a Pt:Ir atomic ratio of 1:1 and 40 wt % of metal on the carbon support.

Example 2. Testing of Nitrogen-Functionalized Platinum-Iridium Catalyst

Figure 2A:
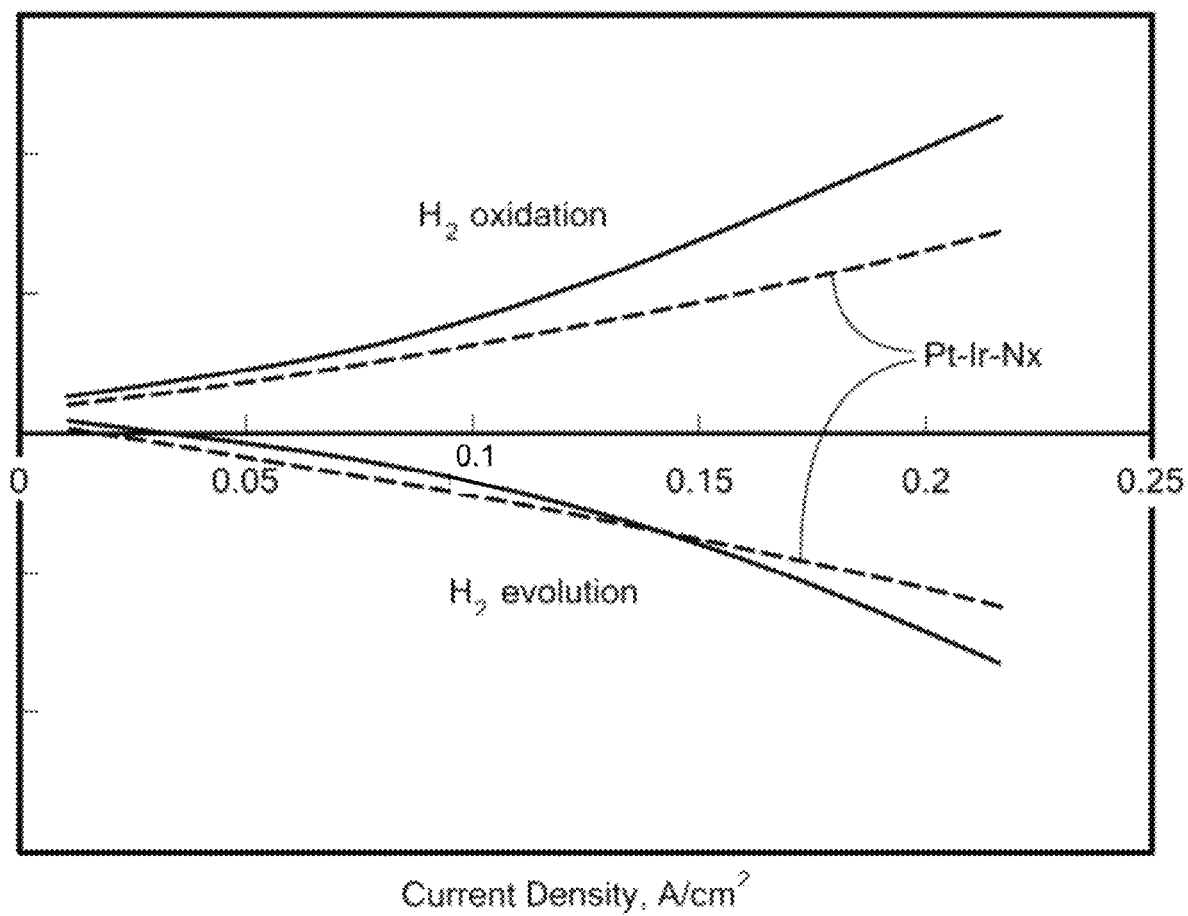
FIGS. 2A-2B show initial performance tests of Pt—Ir-Nx vs. Pt catalyst.
Figure 2B:
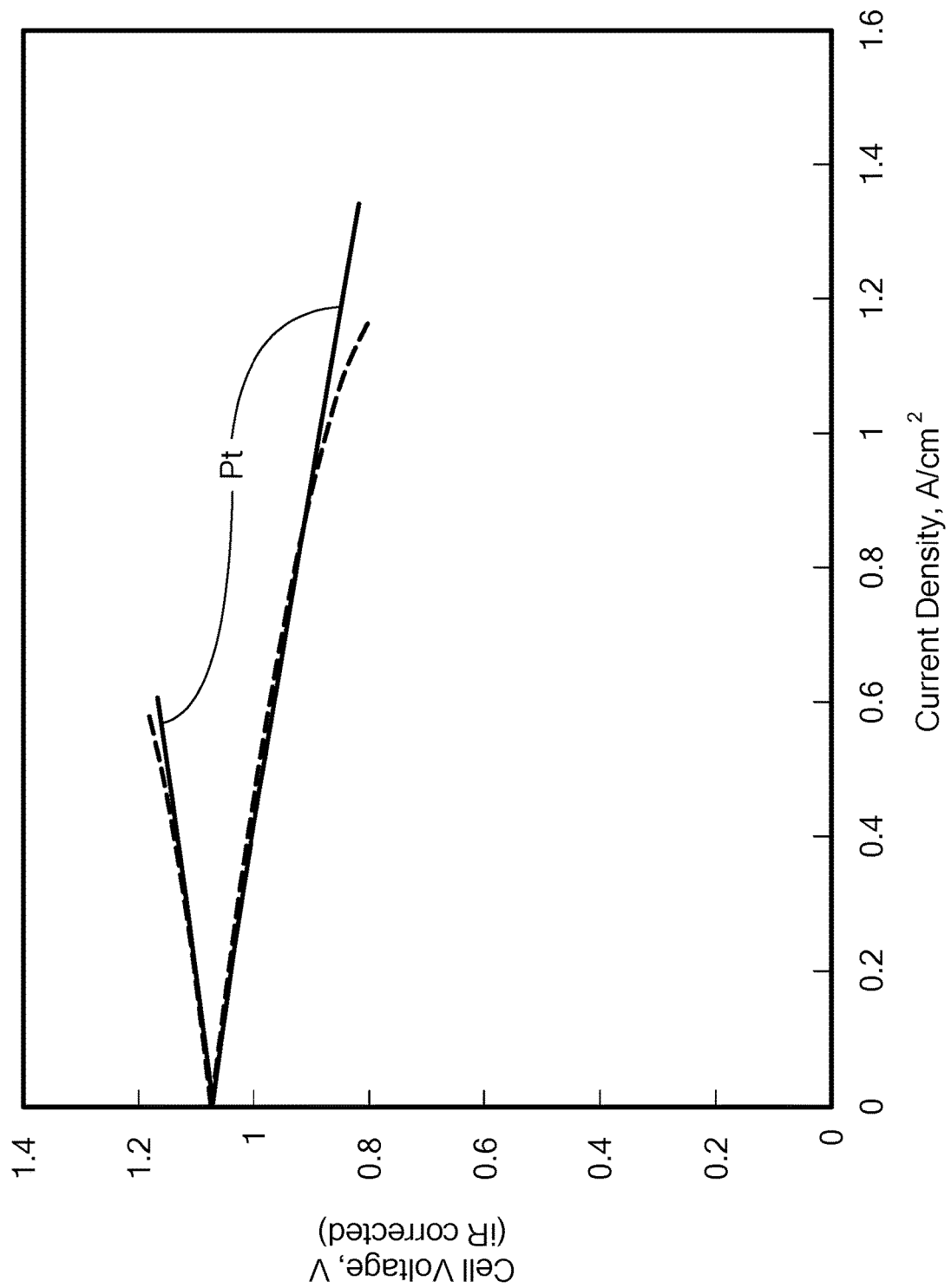

Pt—Ir—$N_X$/C catalysts were tested in both a $H_2$-pump cell and a $H_2$/$Br_2$ flow cell, and the iR-corrected performance is shown in FIG. 2. Performance of a platinum electrode is shown for comparison. Note that the non-zero OCV of the $H_2$-pump cell was caused by slight $H_2$ gas pressure difference between the cathode and anode gas streams. In the $H_2$-pump cell, the Pt—Ir—$N_X$/C sample exhibited improved HOR activity and nearly identical HER activity when compared to that of the standard Pt/C catalyst, whereas in the $H_2$/$Br_2$ flow cell, the Pt—Ir—$N_X$/C showed performance identical to Pt up to 1 A/cm$^2$ even with a lower metal loading. The lower performance beyond 1 A/cm$^2$ may be attributed to the un-optimized catalyst and electrode structures.

Figure 3A:
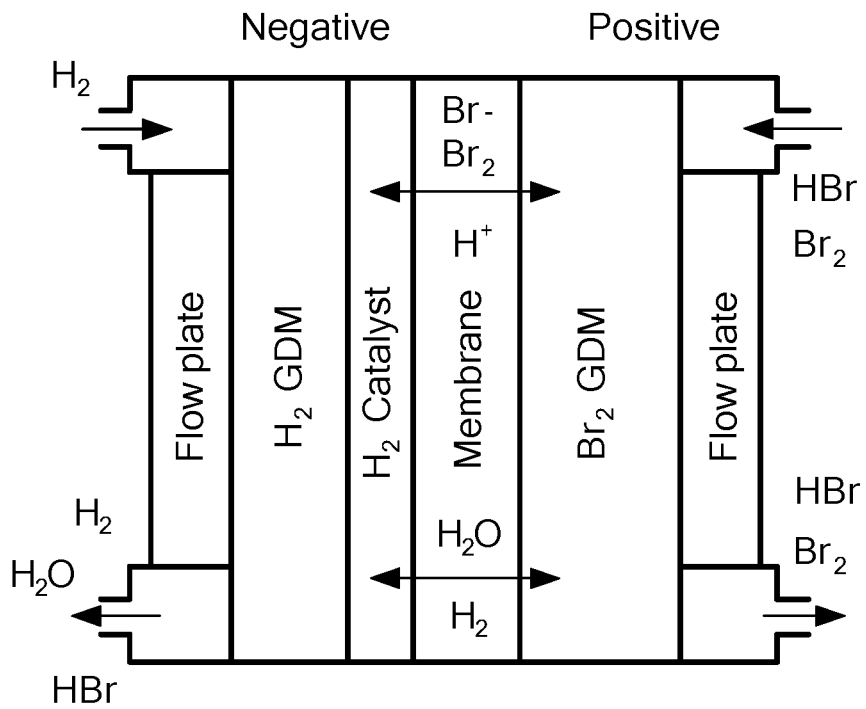
FIGS. 3A-3B show schematic representations of the durability testing setups.
Figure 3B:
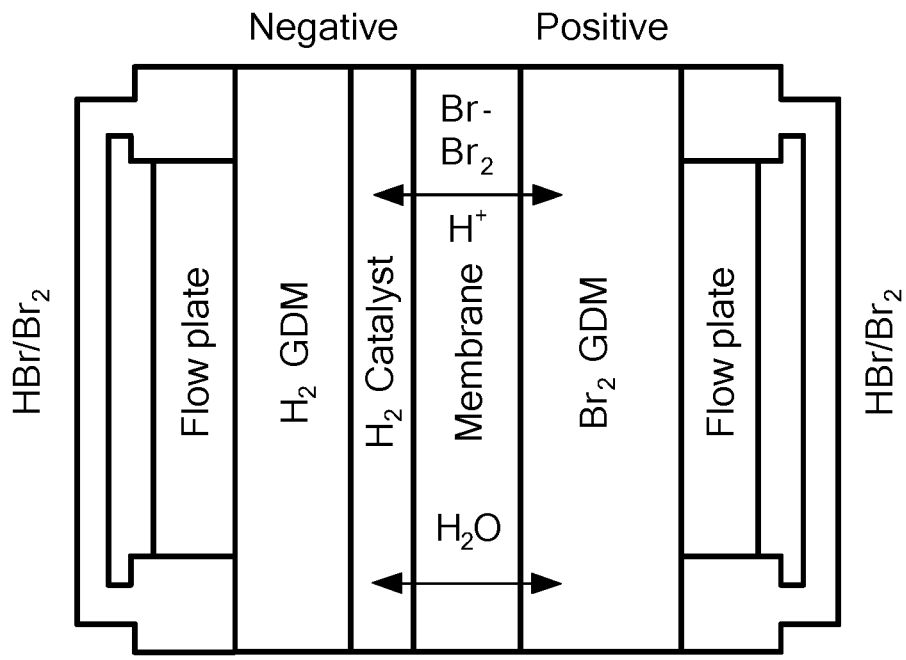
Figure 4A:
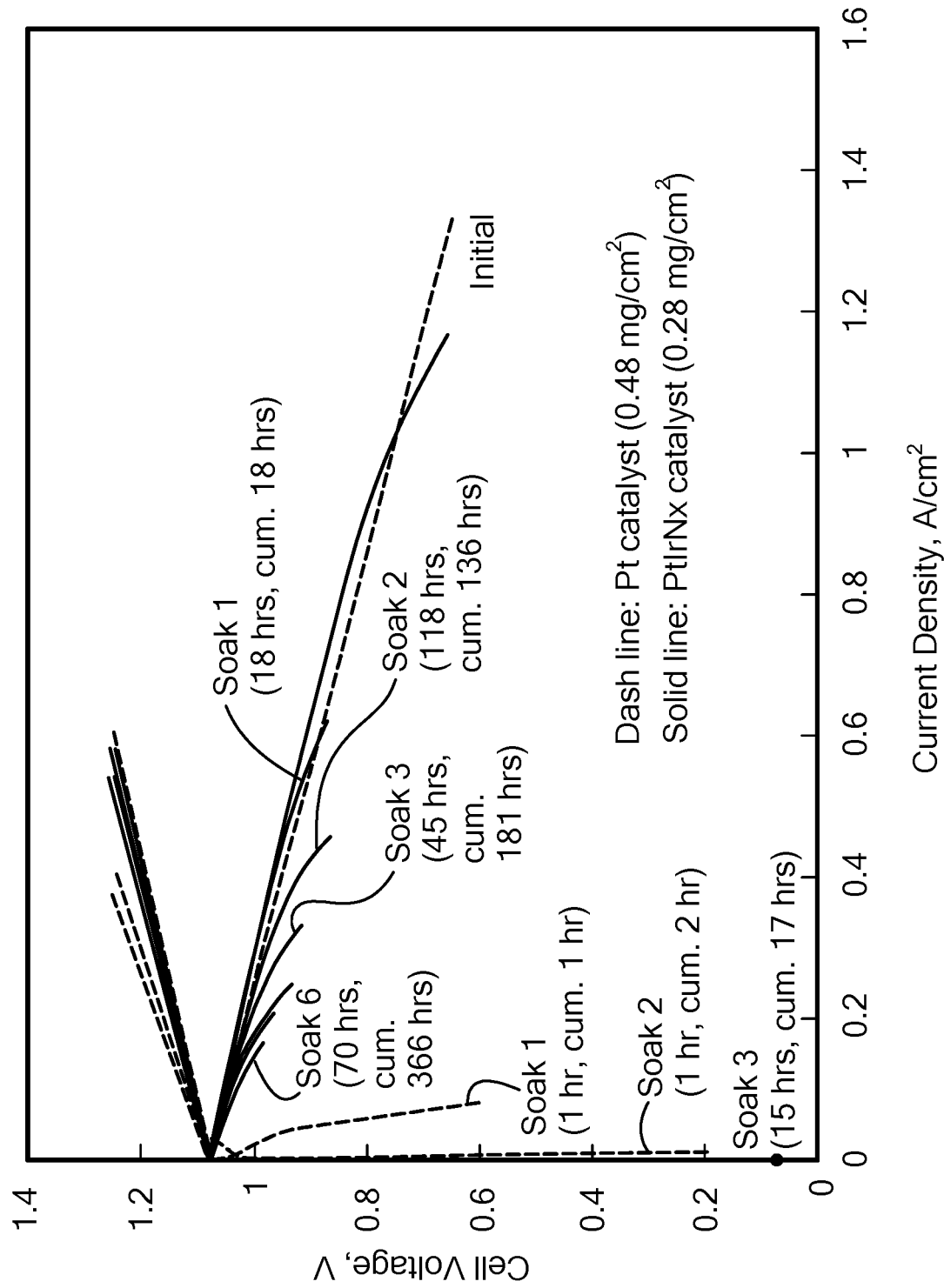
FIGS. 4A-4B show Pt—Ir—$N_X$ and Pt catalyst durability test results.
Figure 4B:
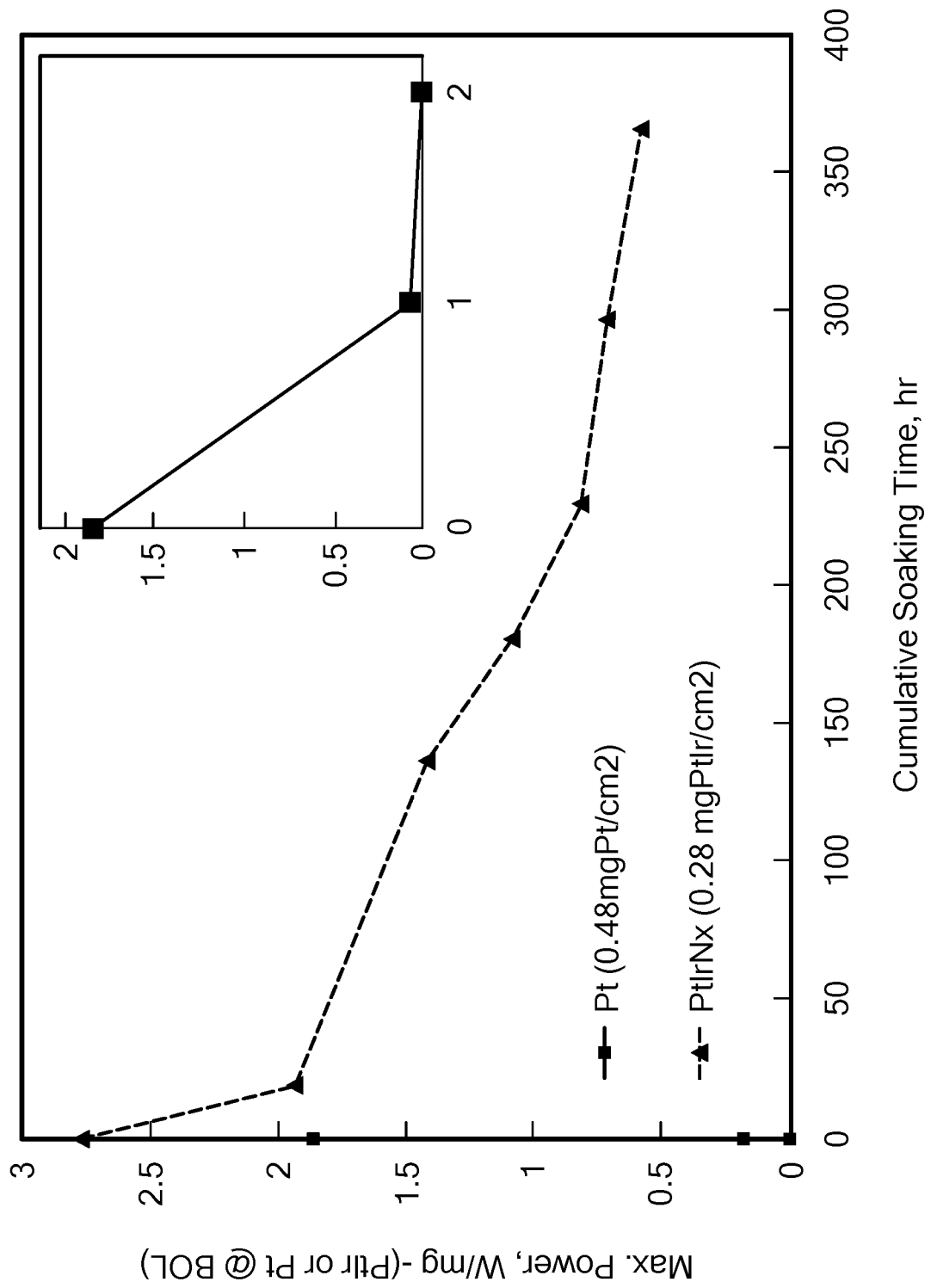
Figure 5A:
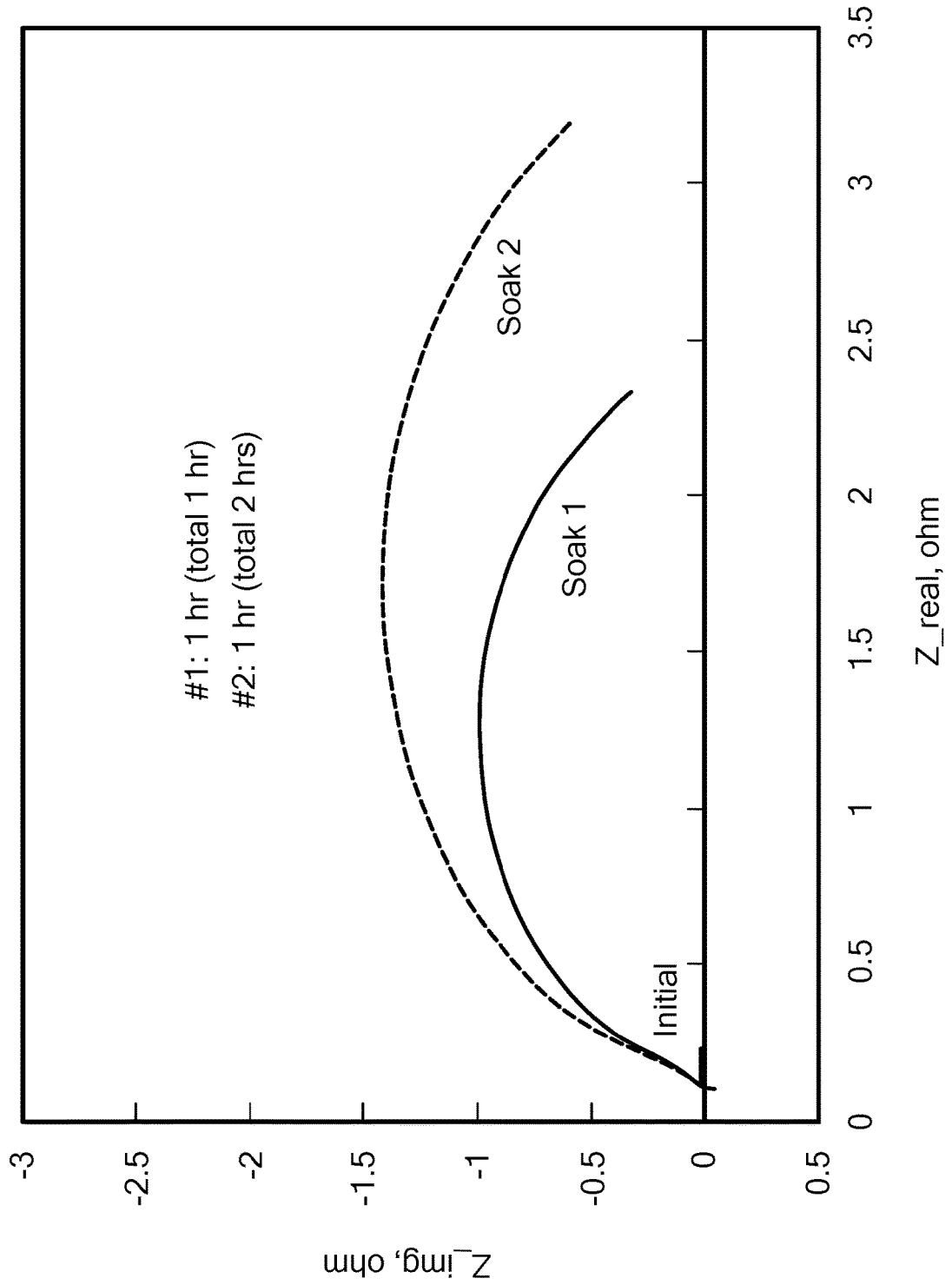
FIGS. 5A-5B show the AC Impedance after in-cell soaking (a-Pt; b-Pt—Ir—$N_X$).

To evaluate the Pt—Ir—$N_X$/C catalyst durability, the catholyte was introduced into the negative side of the flow cell thereby soaking the $H_2$ electrode for various periods of time (see FIG. 3). This is considered to be a worst-case condition for the $H_2$ electrode. At the end of soaking, dry nitrogen was flowed into the cell for 10 to 20 minutes to flush out the solution. Polarization performance and AC impedance were then re-assessed with hydrogen flow, followed by subsequent soakings. To ensure performance degradation was not caused by electrode flooding, an interdigitated flow field was used at the $H_2$ side and multiple scans were conducted to obtain reproducible performance data. For comparison, a Pt electrode was tested under the same conditions. The results are shown in FIGS. 4 and 5.

Figure 5B:
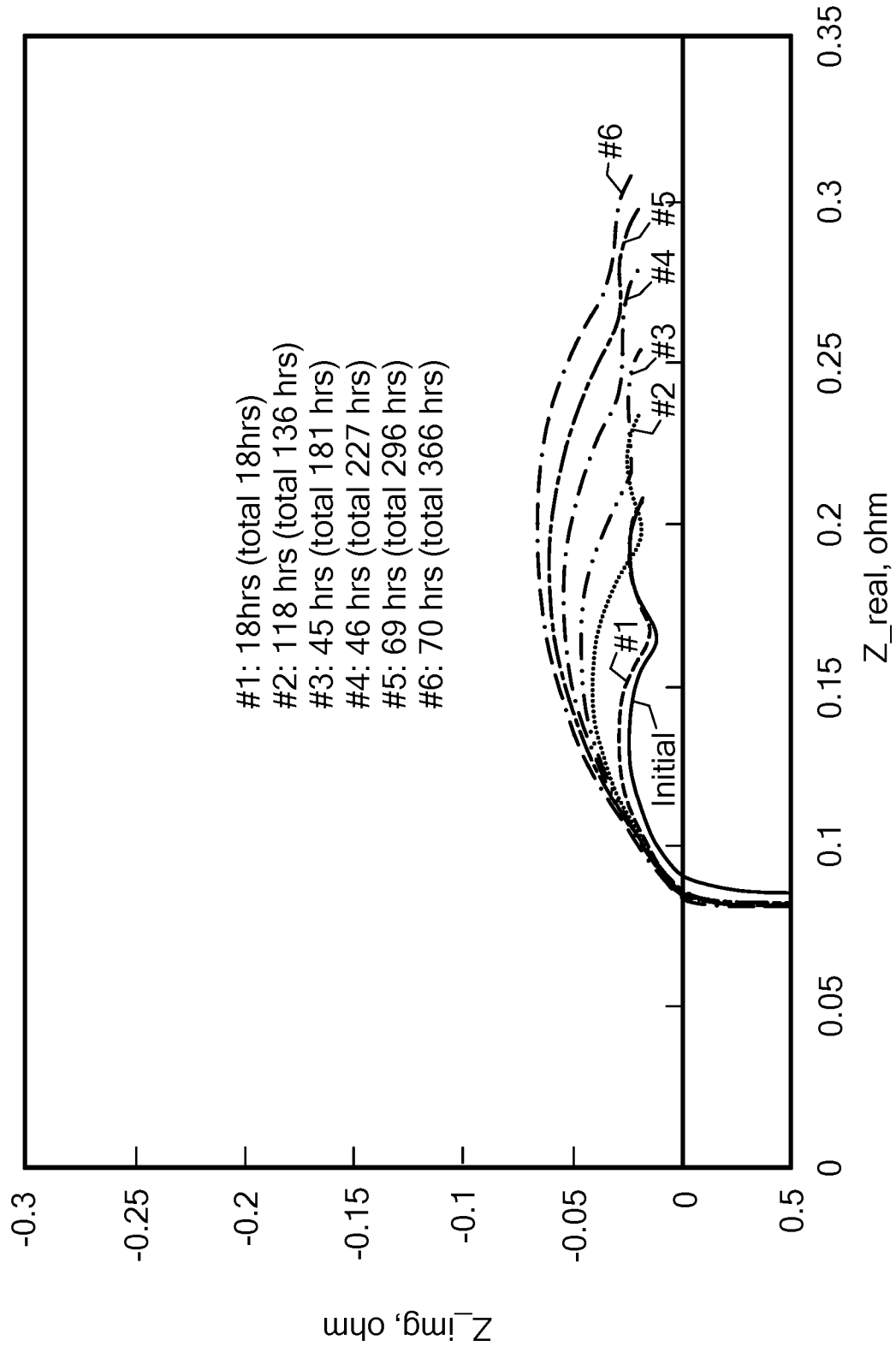

After each soaking, both cells with Pt and Pt—Ir—$N_X$ catalysts exhibited decreased OCV near zero. A short pulse of charge voltage (1.25 V for 5 seconds) was then applied to the cells. The Pt electrode OCV recovered partially after each early soaking but did not recover after cumulative 17-hour soaking. After only one hour of soaking, the cell with the Pt electrode exhibited negligible discharge power (FIG. 4B) and drastically increased $H_2$ electrode charge-transfer resistance (FIG. 5B). In contrast, the cell OCV with Pt—Ir—$N_X$ catalyst recovered fully after each soaking and persisted through 366 hours of cumulative soaking. AC impedance in FIG. 5B showed a small gradual increase in $H_2$ electrode resistance, in stark contrast to the large increase observed for Pt. FIG. 4A shows that after soaking the cell for 18 hours, the charge performance changed very little and the discharge performance was nearly unchanged within the current range of 0 to 0.5 A/cm$^2$ (normal operation range for high efficiency). Although the Pt—Ir—$N_X$/C catalyst is not entirely immune to bromide/bromine adsorption and corrosion, the maximum power from the Pt—Ir—$N_X$ catalyst was still about 0.58 W/mg metal after 366 cumulative hours of soaking (FIG. 4B). This was a significant improvement over the Pt catalyst, which failed after one hour of soaking.

Example 3. Cycling Test

Figure 6A:
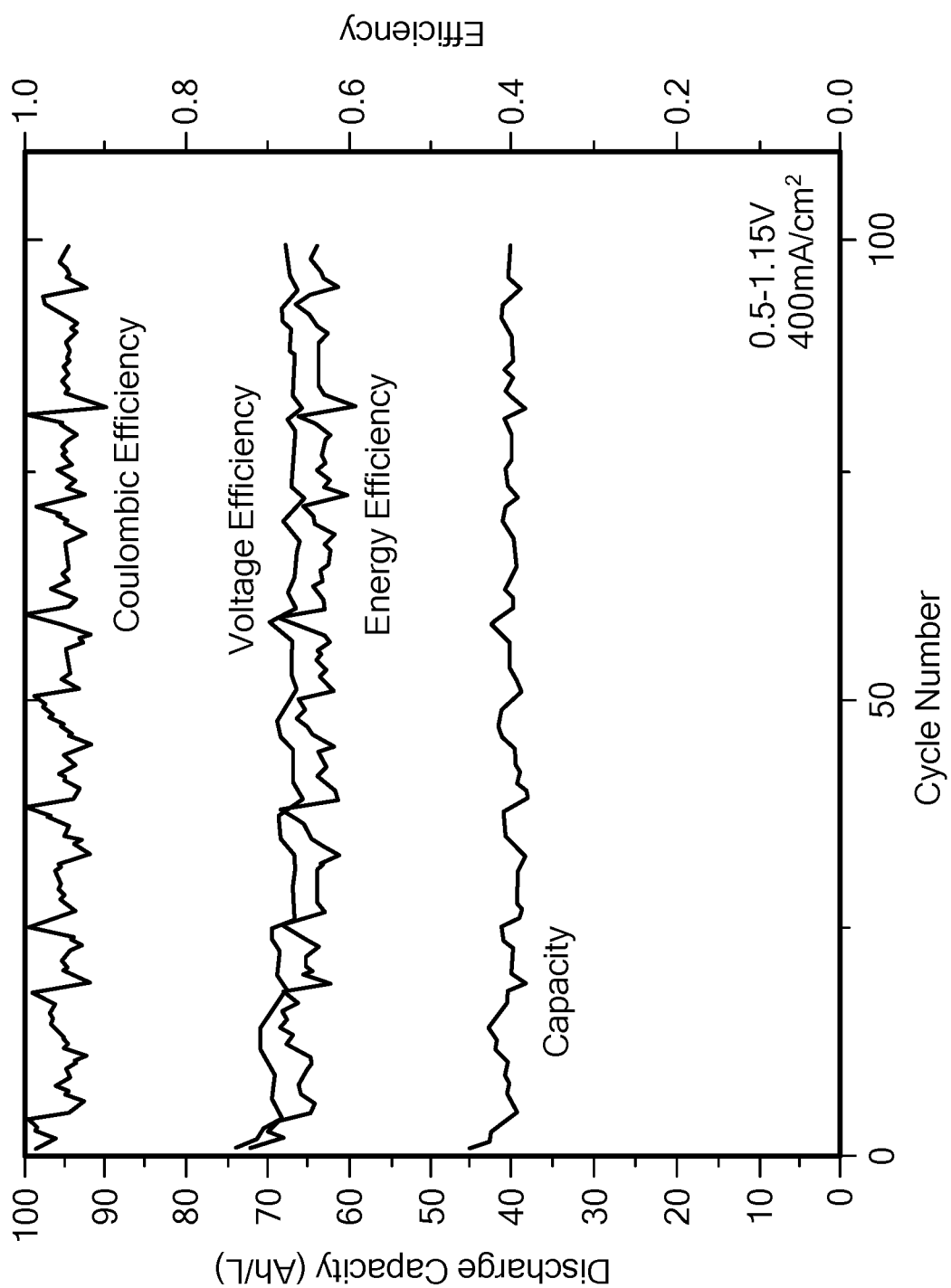
FIGS. 6A-6B show results of a cycling test.
Figure 6B:
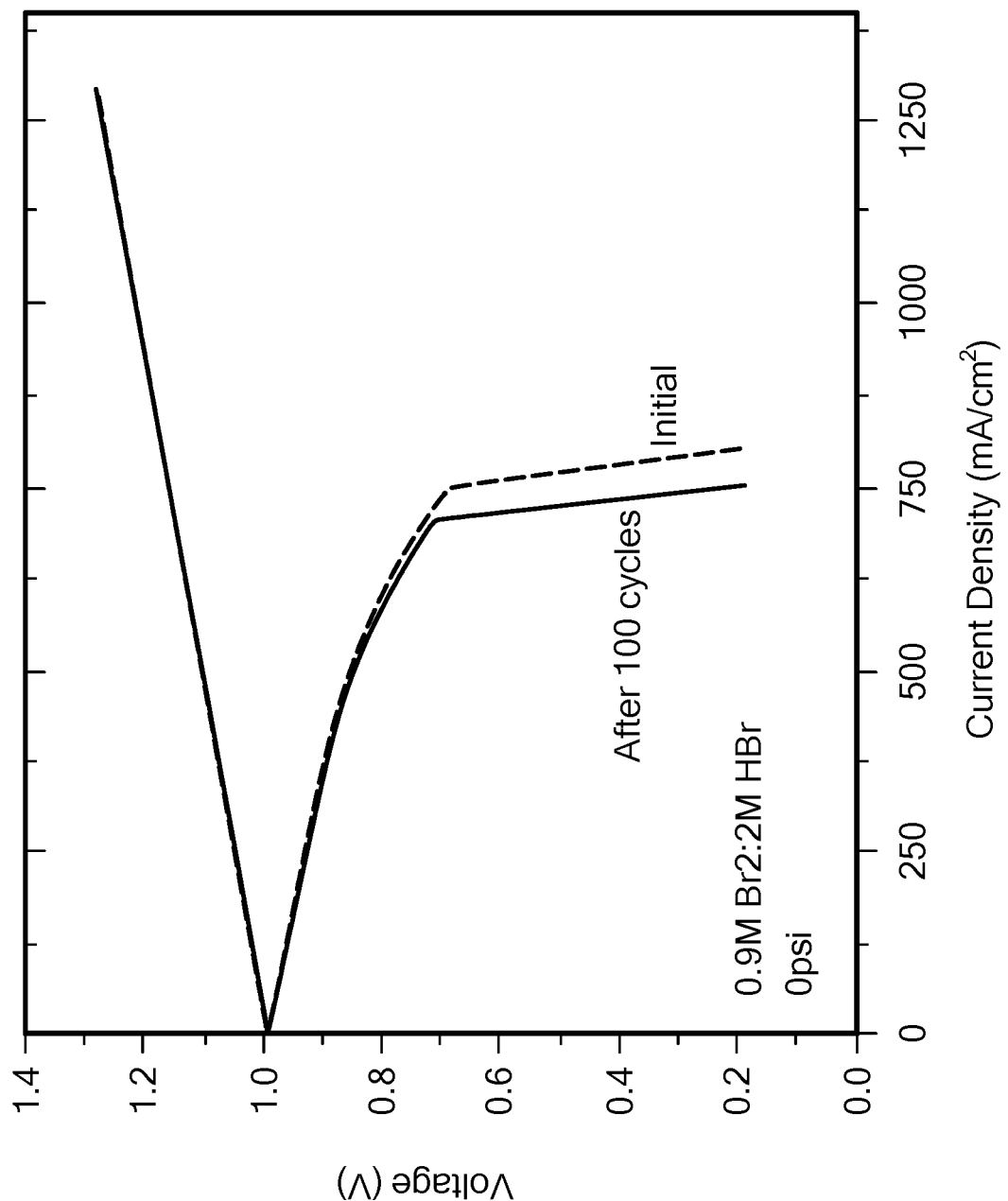

A NAFION/PVDF electrospun composite membrane and Pt—Ir—$N_X$ $H_2$ electrode were assembled into a 10-cm$^2$ flow cell and subjected to a weeklong cycling test. For the cycling test the electrospun single-fiber tri-layer NAFION/PVDF membrane with 13 wt % overall PVDF content was used. The $H_2$ electrode was prepared by coating Pt—Ir—$N_X$/C catalyst ink onto a SGL GDL 10BC with a loading of 0.5 mg metal/cm$^2$. Due to the design of the flow field, which was not optimized for a one-layer CNT $Br_2$ electrode, a baseline (+) electrode was used in this cycling test to avoid excessive pressure drop. The cell was assessed for initial performance with 2 M HBr/0.9 M $Br_2$ solution and then cycled 100 times at a current density of 400 mA/cm$^2$ with cutoff voltages of 0.5/1.15 V. Cell performance was re-assessed after cycling (FIGS. 6A-6B).

The capacity was very stable with an average 95% coulombic efficiency throughout the cycling test. The spikes arose from fluctuations in the syringe pump recirculating rate returning the solution accumulated at the $H_2$ exhaust back to the catholyte bottle. After cycling, identical charge performance was maintained and minimal degradation was observed in the discharge performance. The small change in discharge performance may arise from increased bromide adsorption on the $H_2$ electrode or membrane permeability evolution, or small experimental deviations in bromine/bromide ratio, bromine concentration, or hydrogen pressure/flowrate, as these are known to impact high-current discharge performance. The voltaic efficiency was somewhat lower than 0.7 due to the un-optimized tri-layer composite membrane. Nevertheless, the new materials demonstrated excellent stability in the cycling test. The cycling test was about one week long, while flow batteries are expected to operate for many years.

The cell was also assessed for its performance with 1 M HBr/0.9 M $Br_2$ solution. It was noticed that the cell performed similar to cells with previous materials when using 1M HBr/0.9 M $Br_2$ solution, but the performance with 2M HBr/0.9 M $Br_2$ solution was somewhat worse than that of cells using the previous materials.

This application claims the priority of U.S. Provisional Application No. 62/160,241 filed 12 May 2015 and entitled "Nitrogen-Functionalized Platinum-Iridium Electrocatalyst", the whole of which is hereby incorporated by reference.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

While the present invention has been described in conjunction with certain preferred embodiments, one of ordinary skill, after reading the foregoing specification, will be able to effect various changes, substitutions of equivalents, and other alterations to the compositions and methods set forth herein.

The invention claimed is:

1. A catalyst comprising metallic nanoparticles bound to a solid support, the metallic nanoparticles comprising a material having a formula of $Pt-M-N_x$, wherein M is a transition metal element selected from the group consisting of Ir- and Rh, and wherein $0.1<x<10$, wherein the solid support comprises carbon black nanoparticles or microparticles, and wherein the catalyst comprises 10% to 70% (wt/wt) of the material having a formula of $Pt-M-N_x$.

2. The catalyst of claim 1, wherein M is Ir.

3. The catalyst of claim 1 that is suitable for use as an electrocatalyst in a reversible hydrogen electrode of a hydrogen-bromine redox flow battery.

4. The catalyst of claim 1 that is more stable in a hydrogen-bromine redox flow battery than a Pt/C or Pt-M/C catalyst.

5. The catalyst of claim 4 that is more resistant to halide poisoning hydrogen-bromine redox flow battery than a Pt/C or Pt-M/C catalyst.

6. An electrode comprising the catalyst of claim 1.

7. A proton exchange membrane electrolyzer comprising the catalyst of claim 1.

8. A hydrogen-bromine redox flow battery comprising the catalyst of claim 1.

9. A method of making a hydrogen-bromine redox flow battery, the method comprising adding the catalyst of claim 1 to a structure as part of a process to produce a hydrogen-bromine redox flow battery.

* * * * *